United States Patent Office 3,636,215
Patented Jan. 18, 1972

3,636,215
DERIVATIVES OF MALEOPIMARIC ACID,
USEFUL AS NEMATOCIDES
Walter H. Schuller and Jacob C. Minor, Lake City, Seymour S. Block, Gainesville, and Ray V. Lawrence, Lake City, Fla., assignors to the United States of America as represented by the Secretary of Agriculture
No Drawing. Filed Nov. 21, 1969, Ser. No. 878,921
Int. Cl. A01n 9/00, 9/38
U.S. Cl. 424—245
10 Claims

ABSTRACT OF THE DISCLOSURE

This invention relates to the use of dialkylaminoalkyl imides of maleopimaric acid as nematocides. It also relates to the analogs, such as salts of the carboxyl group as well as to the quaternary ammonium salts of the dialkylaminoalkyl group as effective nematocides.

---

A non-exclusive, irrevocable, royalty-free license in the invention herein described, throughout the world for all purposes of the United States Government, with the power to grant sublicenses for such purposes, is hereby granted to the Government of the United States of America.

Some of the compounds used in the instant invention have been described in the U.S. Pat. 3,135,749 (June 2, 1964) granted to R. O. Clinton and A. J. Manson. The compounds were found to possess hypotensive and coronary dilator activity.

The preparation of one of these compounds, namely, 1,1-dimethylaminopropylmaleopimarimide (I) has been described in the above cited patent and more thoroughly characterized

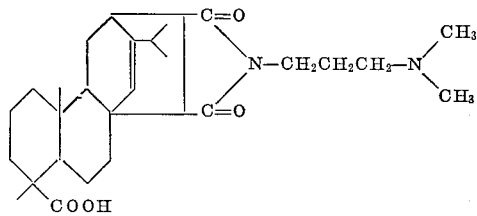

in the publication by W. H. Schuller and R. V. Lawrence "Some New Derivatives of Maleopimaric Acid," J. Chem. Eng. Data, 12, 267–269 (1967).

This particular compound has been examined at length and found to have nematocidal properties. The copper salt and the mercury salt (of the carboxyl group) of this imide were also prepared and found to be active as nematocides. Some fatty amine salts and alkali metal salts were also prepared and found to be moderately active. The quaternary ammonium salt of the dailkylaminoalkyl moiety was prepared and found to be moderately active.

A number of analogs were prepared in which the nature of the alkyl groups attached to the terminal nitrogen were varied and most found to have moderate activity. The length of the alkyl group separating the imide nitrogen from the basic nitrogen atom was also varied and the compounds found to have moderate activity.

EXAMPLE 1

1,1-dimethylaminopropylmaleopimarimide is prepared by refluxing a mixture of 40 g. (0.10 mole) of maleopimaric acid and 11.24 g. (0.12 mole) of 1,1-dimethylaminopropylamine in 500 ml. of benzene. In 12 minutes, a solid mass of crystals fills the flask. The theoretical amount of water is liberated in 1.5 hours and refluxing is carried out for a total of 4 hours. The crystals are collected; weight 36.5 g. An 8.0 gl. portion is extracted with ethyl acetate in a Soxhlet-type extractor for 2 hours; weight of remaining solid is 7.12 g. This product is recrystallized from 95% ethanol to give 4.63 g. (41%) of imide; M.P. 237–240° C., unchanged on further recrystallization, $[\alpha]_D^{25}$ —21.0° (c.=1.4 in chloroform); no characteristic absorption from 220–320 m$\mu$, high end absorption; $\lambda_{max}$. (Nujol mull) 5.68 (m) (imide), 5.88 (s) (imide) $\mu$.

Analysis.—Calcd. for $C_{29}H_{44}N_2O_2$: C, 71.9; H, 9.15; N, 5.78; O, 13.2; neutral equivalent 485. Found: C, 72.0; H, 9.02; N, 5.72; O, 13.3; neutral equivalent (base) 479, (acid) 485 (in acetone).

The structure of this compound is as follows:

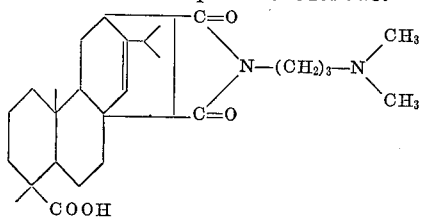

EXAMPLE 2

The compound described in Example 1 is made up to 100,000 p.p.m. in acetone for testing purposes. This solution is diluted 1:10 in water with 1% Tween 80 tris(polyoxyethylene)sorbitan monooleate. The 10,000 p.p.m. solution is added to an equal volume of nematodes, *Panagrellus redivivus*, in water to give a final concentration of 5,000 p.p.m. After 24 hours, the organisms are examined under a microscope and the number of dead nematodes is ascertained. The results on a number of preparations of 1,1-dimethylaminopropylmaleopimarimide are as follows:

| Test No. | Run No. | Conc., p.p.m. | Dead, percent |
|---|---|---|---|
| 1 | A | 10,000 | 95 |
|   |   | 1,000 | 100 |
|   |   | 100 | 0 |
| 1 | B | 10,000 | 95 |
|   |   | 1,000 | 100 |
|   |   | 100 | 0 |
| 2 | A | 10,000 | 95 |
|   |   | 1,000 | 97 |
|   |   | 100 | 0 |
| 2 | B | 10,000 | 100 |
|   |   | 1,000 | 95 |
|   |   | 100 | 0 |
| 2 | C | 10,000 | 100 |
|   |   | 1,000 | 90 |
|   |   | 100 | 0 |
| 3 | A | 10,000 | 100 |
|   |   | 1,000 | 90 |
|   |   | 100 | 0 |
| 3 | B | 10,000 | 98 |
|   |   | 1,000 | 90 |
|   |   | 100 | 0 |
| 3 | C | 10,000 | 100 |
|   |   | 1,000 | 90 |
|   |   | 100 | 1 |
| 3 | C [1] | 10,000 | 98 |
|   |   | 1,000 | 99 |
|   |   | 100 | 0 |
| 4 | A | 1,000 | 98 |
|   |   | 500 | 95 |
|   |   | 250 | 70 |
|   |   | 125 | 5 |
|   |   | 62.5 | 0 |
| 4 | B | 1,000 | 98 |
|   |   | 500 | 90 |
|   |   | 250 | 10 |
|   |   | 125 | 0 |
|   |   | 62.5 | 0 |
| 4 | C | 1,000 | 93 |
|   |   | 500 | 72 |
|   |   | 250 | 0 |
|   |   | 125 | 0 |
|   |   | 62.5 | 0 |
| 4 | C [1] | 1,000 | 90 |
|   |   | 500 | 5 |
|   |   | 250 | 0 |
|   |   | 125 | 0 |
|   |   | 62.5 | 0 |
| 5 | A | 1,000 | 100 |
|   |   | 500 | 100 |
|   |   | 250 | 22 |
|   |   | 125 | 0 |

Footnotes at end of table.

TABLE—Continued

| Test No. | Run No. | Conc., p.p.m. | Dead, percent |
| --- | --- | --- | --- |
| 5 | B | 1,000 | 100 |
|   |   | 500 | 97 |
|   |   | 250 | 95 |
|   |   | 125 | 10 |
| 5 | C | 1,000 | 100 |
|   |   | 500 | 99 |
|   |   | 250 | 60 |
|   |   | 125 | 1 |

[1] New solution.

EXAMPLE 3

The copper salt of 1,1-dimethylaminopropylmaleopimarimide is prepared by dissolving 10 g. of the imide prepared in Example 1 in 50 ml. of mineral spirits. Concentrated 28% ammonium hydroxide (3.4 ml.) is added to pH 11. To this mixture is slowly added a solution of 2.5 g. of cupric sulfate-pentahydrate in about 5 ml. of warm water, with stirring. A greenish precipitate forms which is collected by filtration, washed with warm water, and dried. Tests on this material as a nematocide according to the procedure described in Example 2 give the following results: percent kill: 10,000 p.p.m./100; 1,000 p.p.m./100; 100 p.p.m./30; 10 p.p.m./0.

EXAMPLE 4

The mercury salt of 1,2-dimethylaminopropylmaleopimarimide is prepared as follows. Ten g. of 1,1-dimethylaminopropylmaleopimarimide is dissolved in 90 ml. of mineral spirits and 3.4 ml. of concentrated 28% ammonium hydroxide is added to pH 10. A solution of 2.07 g. of mercuric chloride in 5 ml. of warm water is prepared and added slowly with stirring, to the first solution. A gray-white precipitate forms which is collected by filtration, washed with hot water, and dried. Tests on this material as a nematocide according to the procedure described in Example 2 give the following results: percent kill: 10,000 p.p.m./100; 1,000 p.p.m./100; 100 p.p.m./30; 10 p.p.m./0.

EXAMPLE 5

A solution of 1,1-dimethylaminopropylmaleopimarimide dissolved in 15 ml. of ethyl bromide is refluxed one hour and the excess reagent removed by stripping. This residual quaternary ammonium salt exhibits a neut. equiv. of 588 (theory 594) when titrated with alkali.

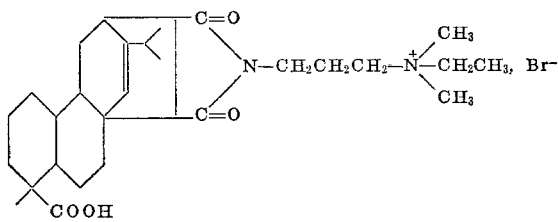

The quaternary ammonium salt exhibits the following activity as a nematocide when tested as described in Example 2. Percent kill: 10,000 p.p.m./90; 1,000 p.p.m./10.

EXAMPLE 6

To a solution of 15 g. of the monoacid chloride of maleopimaric acid (prepared as described in J. Chem. Eng. Data, 12, 267 (1967)) dissolved in 100 ml. of dry benzene is slowly added a solution of 7.0 g. (2 mole equivalents) of 1,1-dimethylaminopropylamine. The solution is refluxed for 3.5 hours and the solvent stripped off under reduced pressure to give the product as follows; it exhibits a neut. equiv. of 290, theoretical 2884.5, when titrated with standard acid.

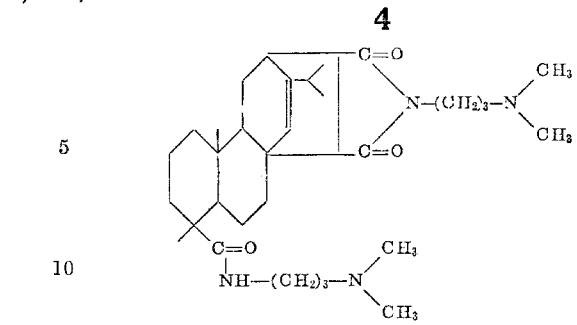

The activity of this compound as a nematocide when tested as in Example 2 above, is as follows: percent kill: 10,000 p.p.m./97; 1,000 p.p.m./60.

EXAMPLE 7

To a solution of 20 g. of maleopimaric acid in 120 ml. of benzene is added slowly 5.8 g. of 3-isopropylaminopropylamine. The solution is refluxed 4 hours and the solvent then removed by stripping under reduced pressure. A crystalline mass was obtained of structure as follows:

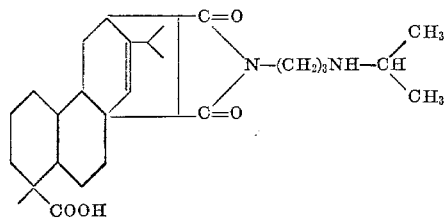

It exhibited a neut. equiv. of 490 when titrated with standard alkali; theoretical 499.

EXAMPLE 8

To a solution of 10 g. of 1,1-dimethylaminopropylmaleopimarimide in 25 ml. of 95% ethanol was added a solution of 1.41 g. of sodium hydroxide in 4 ml. of water; pH 10.0. The solution is concentrated under vacuum until about 85% of solvent is removed. The precipitate which formed was filtered, the white powder dried, and tested (yield 90%). When tested as a nematocide as described in Example 2, the sodium salt exhibits the following activity: percent kill: 10,000 p.p.m./10.

EXAMPLE 9

To a solution of 20 g. of malepimaric acid in 100 ml. of dry benzene is added 6.45 g. of diethylaminopropylamine in 10 ml. of benzene and the solution is refluxed 3 hours. An off-white solid precipitates out and is collected in 90% yield. It exhibits a neut. equiv. of 508 when titrated with standard alkali; theory 513.

The structure of this compound is:

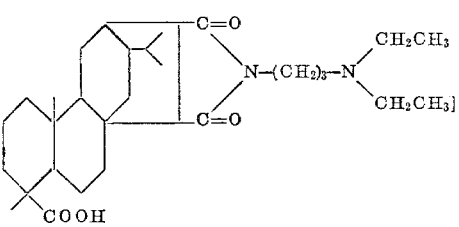

When tested as a nematocide as described in Example 2, the compound exhibits the following activity: percent kill: 10,000 p.p.m./25.

EXAMPLE 10

To a solution of 20 g. of maleopimaric acid in 100 ml. of benzene is added 7.7 g. of ethoxyethoxypropylamine in 10 ml. of benzene. The solution is refluxed 4 hours and the solvent stripped under reduced pressure to give a tan solid in 90% yield. When tested as a nematocide as described in Example 2 above, the compound exhibits the following activity: percent kill: 10,000 p.p.m./30.

The structure of this compound is as follows:

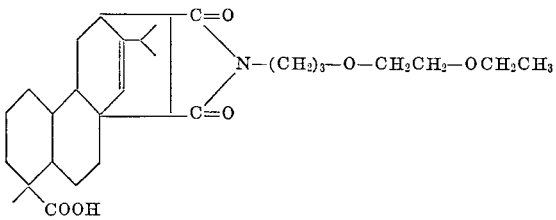

It exhibits a neut. equiv. of 538 when titrated with standard alkali; theoretical 530.

We claim:

1. A process for killing nematodes which comprises contacting nematodes with an aqueous dispersion containing a nematocidal effective amount of a member selected from the group consisting of 1,1-dimethylaminopropylmaleopimarimide, the copper salt of 1,1-dimethylaminopropylmaleopimarimide, the sodium salt of 1,1-dimethylaminopropylmaleopimarimide, the mercury salt of 1,1-dimethylaminopropylmaleopimarimide, the ethyl bromide quaternary salt of 1,1-dimethylaminopropylmaleopimarimide, the 1,1-dimethylaminopropylamide of 1,1 - dimethylaminopropylmaleopimarimide, 1-isopropylaminopropylmaleopimarimide, 1,1 - diethylaminopropylmaleopimarimide, and ethoxyethoxy propylmaleopimarimide.

2. The process of claim 1 wherein the nematodes are contacted with an aqueous dispersion of 1,1-dimethylaminopropylmaleopimarimide.

3. The process of claim 1 wherein the nematodes are contacted with an aqueous dispersion of the copper salt of 1,1-dimethylaminopropylmaleopimarimide.

4. The process of claim 1 wherein the nematodes are contacted with an aqueous dispersion of the sodium salt of 1,1-dimethylaminopropylmaleopimarimide.

5. The process of claim 1 wherein the nematodes are contacted with an aqueous dispersion of the mercury salt of 1,1-dimethylaminopropylmaleopimarimide.

6. The process of claim 1 wherein the nematodes are contacted with an aqueous dispersion of the ethyl bromide quaternary salt of 1,1-dimethylaminopropylmaleopimarimide.

7. The process of claim 1 wherein the nematodes are contacted with an aqueous dispersion of the 1,1-dimethylaminopropyl amide of 1,1 - dimethylaminopropylmaleopimarimide.

8. The process of claim 1 wherein the nematodes are contacted with an aqueous dispersion of 1-isopropylaminopropylmaleopimarimide.

9. The process of claim 1 wherein the nematodes are contacted with an aqueous dispersion of 1,1-diethylaminopropylmaleopimarimide.

10. The process of claim 1 wherein the nematodes are contacted with an aqueous dispersion of ethoxyethoxy propylmaleopimarimide.

References Cited

UNITED STATES PATENTS 3,135,749  6/1964  Clinton et al. _____ 260—247.2

OTHER REFERENCES

Schuller et al., "Some New Derivatives of Maleopimaric Acid" J. Chem. Eng. Data, 12, 267–269 (1967).

STANLEY J. FRIEDMAN, Primary Examiner

A. J. ROBINSON, Assistant Examiner

U.S. Cl. X.R.

424—274